Dec. 18, 1923.

C. J. CRAWFORD 1,477,811

METALLURGICAL FURNACE ROOF

Filed Aug. 14, 1923

Inventor
Charles J. Crawford,
By Shepherd & Campbell
Attorneys

Patented Dec. 18, 1923.

1,477,811

UNITED STATES PATENT OFFICE.

CHARLES JAMES CRAWFORD, OF ST. LOUIS, MISSOURI.

METALLURGICAL-FURNACE ROOF.

Application filed August 14, 1923. Serial No. 657,461.

*To all whom it may concern:*

Be it known that I, CHARLES JAMES CRAWFORD, a citizen of the United States, residing at St. Louis, and State of Missouri, have invented certain new and useful Improvements in Metallurgical-Furnace Roofs, of which the following is a specification, reference being had therein to the accompanying drawings.

This invention relates to an improvement in the roof of an open hearth steel furnace and other furnaces of similar type and construction and which are usually constructed of silica brick, and it has for its object to provide an improved furnace of this nature constructed in such manner as to greatly increase the strength and life of the furnace and to secure increased efficiency in operation.

The invention and the important functional and commercial results flowing therefrom will probably be best understood if we have a clear understanding of the silica brick of commerce, its properties and its many peculiar characteristics, including certain of its fundamental weaknesses.

The chemical analysis of a silica brick shows that it usually contains ($SiO_2$) about ninety-six per cent, (96%) bonded with two per cent (2%) milk of lime $Ca (OH)_2$ with impurities present, such as alumina ($Al_2O_3$) and iron ($Fe_2O_3$) of approximately one per cent (1%), each, with such variations in these figures as will admit very small quantities of magnesia and alkalies, (potash and soda).

The milk of lime bond, which is added in the process of manufacture, serves as the bonding agent, by which the unburned brick is held to its moulded form, and in the process of burning it acts as a flux promoting the formation of a small amount of quartz glass which serves as a matrix for the silica or quartz crystals. In the process of burning a silica brick, a series of inversions take place in which the quartz crystals begin the process of changing to the allotropic forms cristobalite and tridymite. These inversions or molecular conversions are the cause of expansion in a silica brick. The actual bond in a silica brick is due to this expansion in which the crystals interlock and are firmly held together as long as expansion continues.

When tridymite is completely formed, the limit of expansion has been reached and expansion has ended. The force of the interlocking crystals is then spent. The brick having no other bond then loses its strength.

Silica is the strongest of all known refractory materials when under high heat. It softens perceptibly at about a red heat, and from that point until fusion it is of good constant strength, slowly decreasing after long heating as tridymite slowly develops.

Silica brick are prone to spall and crack and are more sensitive to these conditions at lower than at higher temperatures. They are equally sensitive at sudden changes of temperatures, when under heat. They are at their best when working at constant temperature.

It will thus be seen that a silica brick under heat, is undergoing within itself a strain or tension in its molecular or atomic parts, in addition to the load or structural strain imposed upon it as a unit of the furnace structure of which the brick itself is an integral part.

Thus, a silica brick in the roof of an open hearth steel furnace has one end exposed to the air and the other end to a heat of approximately three thousand degrees F.

It is an integral part of an arch, the intrados end of the brick being exposed to high heat and consequently expanding more than the extrados end of the arch brick which are exposed to air. This imposes a great and unnatural structural strain upon the brick in addition to the atomic and molecular strains working within each brick of the arch structure. It is the great torsion or pressure of these complicated strains that causes spalling and cracking and ultimate failure of the arch roof. The average life of an open hearth steel furnace is from two to three hundred heats and covers a period of sixty to ninety days.

It is the purpose of this invention, in the design of brick, block or shapes for an open hearth steel furnace roof, to provide that part of the brick exposed to the greatest heat free and unrestricted opportunity to expand without imposing upon it any of the structural strain or arch pressure. At the same time the part of the brick thus permitted to expand, affords, to a very great extent, a protection against the heat to that portion of the brick employed in sustaining the structural load, giving this portion of the brick that sustains the arch load, a more even temperature and a reduced expansion strain on the intrados or heated side of the arch.

In an open hearth steel furnace the heat is applied to the roof or intrados side of the arch and from that section it is refracted or radiated to the metal in the crucible below.

By this invention I have applied to the roof a checker effect in which I have multiplied about four times the exposed brick heating or radiation surface over the crucible, thereby giving more heat to the metal and securing greater rapidity in heating. This results in increased furnace capacity, greater fuel economy and longer life of the furnace roof. By a system of staggering the checker-like brick, I have reduced the rate of the draft through these checkers which forces the draft of greatest velocity to occur at the extreme or innermost end of the brick. Therefore, the hottest point is at the end of the brick. In this manner I have in a sense created a thermal dam protecting that part of the brick sustaining the arch pressure or structural load. Furthermore by the reduction of the velocity of this draft, I have diminished the high abrasive action of the sharp particles of coal dust and carbon which are drawn from the gas producers and blasted in an impinging flame against the roof, which is recognized as a destructive factor in open hearth operation. A reduction in the velocity of the draft will reduce the amount of suspended slag particles and iron oxide in the furnace, thereby reducing slagging action which is also highly destructive to the roof structure under present design and practice.

I have also devised an improved method of constructing the arch or furnace roof from the brick of my invention. It is of utmost importance that the suspended ends of these arch brick be free and clear of every particle of joint cement or material used in laying up an open hearth roof in order that the end and sides be permitted to expand freely. In constructing this arch, the brick are dipped into the joint cement material in the usual way, the checker end wiped clear and placed on the usual centers by means of any suitable forms of cardboard, roofing paper, green wood or the like, or the reduced ends may be protected against the cement material by a sheath or carton, such as is illustrated in Fig. 7 of the drawing, the same being carefully placed around the checker ends. The joint material or cement in the arch is retained in position and not permitted to fill or seep between the checker ends of the brick. Dimensions are not of importance and I contemplate wide variations in dimensions as experience may dictate.

This invention is not confined in principle to the use of silica material, but to any refractory material, such as fire clay, magnesia, chrome, bauxite, flint clay, diaspore, spinal, rutile, carbon compounds, bonded tridymite or any other refractory material and compound.

The use of the term "brick" in this description shall be broadly applied and shall include in its meaning brick, sizes, tile, special shapes and cements common and usual to the refractories business as now practiced, and the use of this term "brick" shall be thus broadly construed in determining the scope of this patent.

In embodying the invention in a furnace roof of 13 inch construction I use silica brick or blocks of four and one-half by four and one-half by thirteen inches, or four and one-half by four by thirteen inches, or four and one-half by three by thirteen inches, nine inches of the thirteen inch dimension being of such construction as is usual in a square brick or key or wedge brick as might be desired or necessary to use. At the nine inch point the lower end of the brick will be tapered for one-half inch on all four sides to a size where the reduced end would be three and three quarter inches square by three and one-half inches in length. It is within the scope of this invention to vary the tapering point as described so as to make the dimension, if desired, a tapering line of four inches and from four and one-half to three and three quarter inches. When set in the arch of the furnace roof the nine inch end of the bricks will form the arch complete and the remaining four inches which is of reduced area, say three and three quarter inches, will be independently suspended below the point at which the arch strain or pressure is bearing. These brick must be alternately staggered to break joints by commencing on one-half brick in alternate courses in a usual and well known way. By the construction described the velocity of the draft is reduced through these checkered ends, as hereinbefore stated.

One embodiment of the invention is illustrated in the accompanying drawing wherein.

Figure 1:
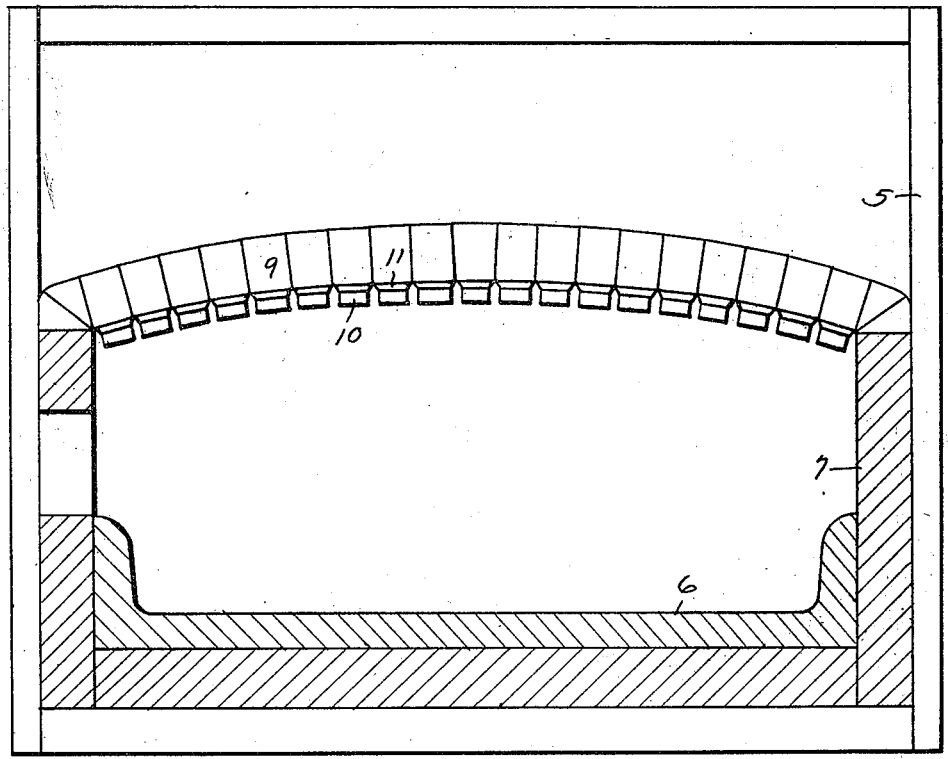
Fig. 1 is a transverse vertical sectional view of an open hearth furnace constructed in accordance with the invention.
Figure 2:
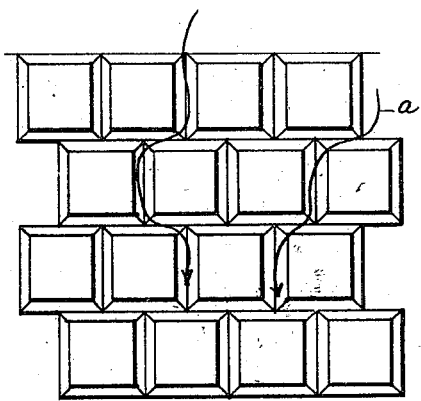
Fig. 2 is an enlarged underside plan view of a portion of the checker work roof of the furnace.
Figure 3:
Fig. 3 is a side elevation of one of the square brick.
Figure 4:
Fig. 4 is a side elevation of a wedge brick.
Figure 5:
Fig. 5 is a side elevation of a half brick by the use of which the alternate courses are staggered, as illustrated in Fig. 2.
Figure 6:
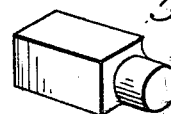
Fig. 6 is a perspective view showing the projecting inner end of the brick as being round in cross section rather than angular, as in the case of the remaining brick, illustrated.
Figure 7:
Fig. 7 is a sectional view of a brick showing a protecting shield used when the arch is in course of construction.

In the drawing 5 designates the buck stays, 6 the crucible and 7 the side walls which support the arch or roof 8. This arch or roof may be of any desired curvature and may be composed of varying sizes and shapes of brick, it being distinctly understood that the invention is not limited to any particular manner of assembly since it is manifest that this may be varied at will and within the expected skill of those versed in this art. It is only essential, to secure the advantages aimed at, that the contacting or abutting portions of the brick 9 of which the roof or arch is composed, be at a point above the lower or intrados ends of said brick. This result is secured in the present instance by reducing the cross sectional area of the brick at their inner ends to form the portions 10 which project below the body proper, of the brick, and preferably connected therewith by tapered shoulders 11. While I prefer to employ these tapered shoulders their use is not essential since the projecting portions 10 may extend directly from the lower portions of the bodies of the brick, if desired. By providing these reduced projecting portions 10 and staggering them in alternate courses as hereinbefore described, I produce a roof of a checker work structure and while the flame as it sweeps along this checker work structure may find its way between the various projections, as indicated by the arrows $a$ in Fig. 2, it is manifest that the point of greatest velocity of the flame will be below the ends of the checker work structure and thus the many abrasive particles carried in the blast of flame will be caused to travel below the lower ends of the brick while a slower moving body of heat will be more or less trapped in the spaces between the lower ends of the projections and the abutting or contacting portions of the brick. It is this body of heat which forms the thermal dam previously referred to and acts in a measure as a protection to the actually contacting portions of the brick. The depending projections constituting the checker work of course become incandescent and thus hold a vast amount of stored heat which is directed down upon the metal in the crucible. Steel manufacturers and users of refractories in general are everywhere crying for better refractories and higher heat. It must be admitted that there is some room for improvement in the refractories field but the fact remains that in most practices of the industry involving the use of high heat the working temperature conditions of furnaces are close to the limit of the refractories to withstand without fusing. It is a visionary idea to think of securing refractory materials which will withstand temperatures much in excess of those already employed. Higher heat is not the panacea for the difficulty but rather more heat, more radiation, more heat of the same temperature and more scientific furnace construction. It is manifest that the present invention admirably secures this result by providing a structure which will:

(a) Greatly increase the heating and radiating surface, (b) Slow up the draft in the channels between the checker work enough to give the heat supplied ample time to do its work before it finds its way to the discharge flues and, (c) Incorporate this idea in a structure wherein the very features that are employed to secure this increased heating and radiating surface are also made to protect the furnace roof against the ordinarily destructive effect of expansion.

It is to be understood that the invention is not limited to the precise construction set forth but that it includes within its purview whatever changes fairly come within either the terms or the spirit of the appended claims.

Having described my invention what I claim is:

1. A furnace roof of refractory material of staggered checker work construction.

2. A furnace roof of refractory brick having reduced inner ends which lie in spaced and staggered relation to each other and which project inwardly beyond the contacting portions of the brick.

3. A furnace roof of refractory brick having reduced inner ends which project inwardly beyond the body portions of the brick, said bricks being laid up in staggered formation to cause said reduced ends to present a checker work formation.

4. A furnace roof of silica or refractory brick laid up in courses to constitute an arch the brick in alternate courses being staggered with respect to each other and said brick having reduced inner ends constituting projections which lie in spaced relation to each other and which are connected with the body portions of said bricks by tapered shoulders, the whole presenting a roof of checker work construction wherein the contacting portions of the bricks at the intrados line of the arch are materially above the ends of said brick as and for the purposes set forth.

5. A top for an open hearth furnace of the character wherein the draft is longitudinally of the furnace comprising a plurality of refractory bricks laid up as a self-supporting arch and wherein the extreme heated inner ends of the brick in said roof are free to expand being relieved of the structural or arch strain and said ends also protecting the intrados line of the roof arch against the maximum heat temperature.

6. In a metallurgical furnace of the character wherein the draft is longitudinal of the furnace, a furnace roof of checker construction the elements of which project inwardly beyond the intrados line of the roof, said checker construction serving to increase the radiation area and reducing the draft velocity above the inner ends of said elements.

7. A furnace of the type wherein the draft is longitudinally of the furnace and means associated with the furnace roof for creating a thermal dam thereunder, said means comprising a checker work construction beneath which the draft of greatest velocity flows.

8. In an open hearth furnace of the character wherein the draft is longitudinally of the furnace a roof with the intrados line of the arch protected by reduced and projecting ends of the brick which are relieved from arch pressure and strain and can expand freely.

9. In an open hearth furnace of the character wherein the draft is longitudinally of the furnace, a roof comprising a plurality of refractory bricks laid up as a self-supporting arch in which the intrados line of the arch has been raised above the heated end of the brick composing said arch.

10. The method of constructing a furnace of bricks which consists of enclosing the inner ends of said bricks in a shield to protect them while being laid in place.

In testimony whereof I hereunto affix my signature.

CHARLES JAMES CRAWFORD.